(12) United States Patent
Chiou

(10) Patent No.: US 6,737,368 B2
(45) Date of Patent: May 18, 2004

(54) MULTIPLE THREAT PENETRATION RESISTANT ARTICLES

(75) Inventor: Minshon J. Chiou, Chesterfield, VA (US)

(73) Assignee: E. I. du Pont de Nemours and Company, Wilmington, DE (US)

(*) Notice: Subject to any disclaimer, the term of this patent is extended or adjusted under 35 U.S.C. 154(b) by 23 days.

(21) Appl. No.: 10/025,124

(22) Filed: Dec. 19, 2001

(65) Prior Publication Data
US 2003/0129900 A1 Jul. 10, 2003

(51) Int. Cl.$^7$ .......................... B32B 27/12; B32B 27/04
(52) U.S. Cl. .................. 442/134; 442/135; 442/239; 442/246; 442/247; 442/251; 442/254; 442/301; 442/381; 442/392; 442/414; 428/902; 428/911
(58) Field of Search .......................... 428/911, 902; 442/134, 135, 239, 246, 247, 251, 254, 301, 381, 392, 414

(56) References Cited

U.S. PATENT DOCUMENTS

| | | |
|---|---|---|
| 3,094,511 A | 6/1963 | Hill, Jr. et al. |
| 3,354,127 A | 11/1967 | Hill, Jr. et al. |
| 3,673,143 A | 6/1972 | Blair et al. |
| 3,819,587 A | 6/1974 | Kwokeck |
| 3,869,429 A | 3/1975 | Blades |
| 4,172,938 A | 10/1979 | Mera et al. |
| 4,457,985 A | 7/1984 | Harpell et al. |
| 5,472,769 A | 12/1995 | Goerz, Jr. et al. |
| 5,578,358 A | 11/1996 | Foy et al. |
| 5,677,029 A | 10/1997 | Prevorsek et al. |
| 5,724,670 A | 3/1998 | Price |
| 5,880,042 A | 3/1999 | Schuster et al. |
| 6,022,601 A | 2/2000 | Pfister et al. |
| 6,133,169 A | 10/2000 | Chiou et al. |
| 6,147,018 A | 11/2000 | Chiou |
| 6,162,746 A | 12/2000 | Chiou |
| 6,475,936 B1 * | 11/2002 | Chiou .................. 442/203 |

FOREIGN PATENT DOCUMENTS

| | | |
|---|---|---|
| DE | 4407180 C1 | 4/1995 |
| DE | 201 01 099 | 3/2001 |
| EP | 0569849 B1 | 5/1993 |
| EP | 0769671 A2 | 9/1996 |
| GB | 2304350 A | 3/1997 |
| GB | 9927674.3 | 1/2000 |
| WO | WO 9320400 | 10/1993 |
| WO | WO 9603277 | 7/1995 |
| WO | WO 99 61862 | 12/1999 |
| WO | WO 0008411 | 2/2000 |
| WO | WO 0137691 A1 | 5/2001 |
| WO | WO 01 50898 | 7/2001 |

OTHER PUBLICATIONS

Man–Made Fibers, Science and Technology, vol. 2, Section Titled Fiber–Forming Aromatic Polyamides, p. 297, Interscience Publishers, 1968.

National Institute of Justice, NIJ Standard–0115.00, "Stab Resistance of Personal Body Armor". Sep. 2000.

National Institute of Justice, NIJ Standard–0101.04, "Ballistic Resistance of Personal Body Armor", Sep. 2000.

J. B. Dickson, "Practical Loom Experience on Weavability Limits", Textile Research Journal (1954) pp. 1083–1093.

* cited by examiner

*Primary Examiner*—Ula C. Ruddock
(74) *Attorney, Agent, or Firm*—John E. Griffiths

(57) ABSTRACT

The present invention relates to multiple threat penetration resistant articles. The articles include, in order, fabric layers, polymer impregnated fabric layers, and woven fabric layers. The articles can additionally include tightly woven fabric layers which define the strike face of the article.

15 Claims, 3 Drawing Sheets

MULTIPLE THREAT PENETRATION RESISTANT ARTICLES

BACKGROUND OF THE INVENTION

1. Field of the Invention

This invention relates to knife and ballistic projectile penetration resistant articles and, more specifically, to spike, knife and ballistic projectile penetration resistant articles.

2. Description of Related Art

Police, correctional officers, security personnel, and even private individuals have a growing need for simultaneous protection from multiple types of penetration threats, including spike, knife and ballistic threats, in a single protective garment.

Body armor material is known for resisting penetration by multiple threats including knives. GB 2304350A and WO 01/37691A1 disclose material designed to protect against knife and ballistic threats. U.S. Pat. No. 6,133,169 discloses a knife, ice pick and ballistic penetration resistant structure comprising a metallic chain mail, tightly woven fabric layers and high tenacity ballistic resistant layers.

Known materials that protect against knife threats typically have (1) flexible metallic plates or metallic chain mails (e.g., U.S. Pat. Nos. 5,472,769 and 6,133,169) or (2) laminated or coated fabrics (e.g., U.S. Pat. Nos. 6,022,601, 5,880,042, GB 2304350A, WO 00/08411, and WO 01/37691A1). However, the flexible metallic components tend to increase the weight of vests and are difficult to be cut into irregular shapes to fit the body. Further, materials with laminated or coated fabrics are rigid, inflexible, and uncomfortable when incorporated in an article to be worn.

Further, merely combining separate materials, each known to protect against one threat, with other material(s) known to protect against other threat(s) does not usually provide a flexible light weight structure comfortable for body wear with adequate protection against multiple threats.

It is an object of this invention to provide a flexible light weight structure that resists penetration by ballistic projectiles and knives. It is a further object to provide a flexible light weight structure that resists penetration by ballistic, knives and spike-like threats These and other objects of the invention will be clear from the following description.

BRIEF SUMMARY OF THE INVENTION

The invention relates to knife and ballistic projectile penetration resistant articles, comprising, in order, a first plurality of layers of fabric made of fibers; a second plurality of layers of fabric made of fibers, each of the layers being substantially surrounded and substantially impregnated by a corresponding polymeric matrix comprising a thermoset resin, a thermoplastic resin, or mixtures thereof; and a third plurality of layers of woven fabric made of fibers. The fibers of the first, second and third plurality of layers have a tenacity of at least 10 grams per dtex. Further, the first, second and third plurality of layers combined have an areal density of no more than 6.9 kilograms per square meter.

The invention is further directed to spike, knife and ballistic projectile penetration resistant articles, comprising, in order, a first plurality of layers of fabric made of fibers; a second plurality of layers of fabric made of fibers, each of the fabric layers being substantially surrounded and substantially impregnated with a corresponding polymeric matrix comprising a thermoset resin, a thermoplastic resin, or mixtures thereof; and a third plurality of layers of woven fabric made of fibers; and a fourth plurality of layers of tightly woven penetration resistant fabric made of fibers. The tightly woven fabric has a fabric tightness factor of at least 0.75. The fibers of the first, second, third and fourth plurality of layers have a tenacity of at least 10 grams per dtex. Further, the first, second, third, and fourth plurality of layers combined have an areal density of no more than 7.8 kilograms per square meter.

BRIEF DESCRIPTION OF THE DRAWING(S)

The invention can be more fully understood from the following detailed description thereof in connection with accompanying drawings described as follows.

DETAILED DESCRIPTION OF THE INVENTION

The present invention is directed to double or triple threat penetration resistant articles. The double threat penetration resistant article resists penetration by knives and ballistic projectiles. The triple threat penetration resistant article resists penetration by spikes, knives and ballistic projectiles.

Penetration Resistant Composite Structures

Figure 1:
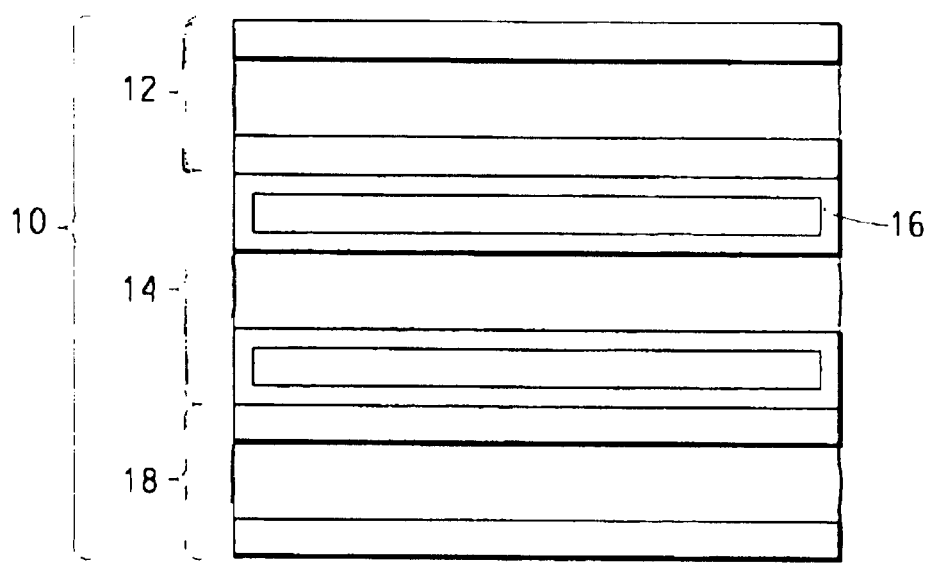
FIG. 1 is a perspective view of a knife and ballistic projectile penetration resistant article in accordance with the present invention.

Referring to FIG. 1, the knife and ballistic projectile penetration resistant article includes a first composite structure 10 which comprises, in order, a first plurality of layers 12 of fabric made of fibers, a second plurality of layers 14 of fabric made of fibers, each of the second plurality of layers 14 being substantially surrounded and substantially impregnated by a corresponding polymeric matrix comprising a thermoset resin, a thermoplastic resin, or mixtures thereof 16, and a third plurality of layers 18 of woven fabric made of fibers. The fibers of the first, second and third plurality of layers 12,14,18 have a tenacity of at least 10 grams per dtex. Further, the first, second and third plurality of layers 12,14,18 combined have an areal density of no more than 6.9 kilograms per square meter (i.e., 1.4 pounds per square foot).

Figure 2:
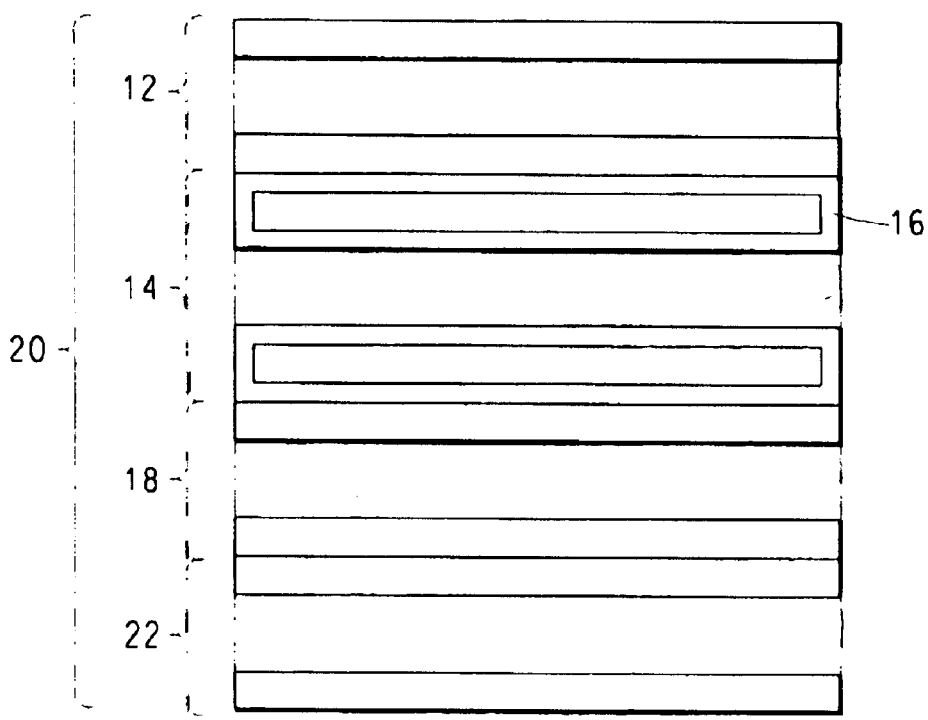
FIG. 2 is a perspective view of a spike, knife and ballistic projectile penetration resistant article in accordance with the present invention.

Referring to FIG. 2, the spike, knife and ballistic projectile penetration resistant article includes a second composite structure 20 which comprises, in order, the first layers 12, the second layers 14, the third layers 18, and then a fourth plurality of layers 22 of tightly woven penetration resistant fabric made of fibers. The tightly woven fabric has a fabric tightness factor of at least 0.75. The fibers of the first, second, third and fourth plurality of layers 12,14,18,22 have a tenacity of at least 10 grams per dtex. The first, second, third, and fourth plurality of layers 12,14,18,22 combined have an areal density of no more than 7.8 kilograms per square meter (i.e., 1.6 pounds per square foot).

The article of the present invention preferably meets at least the Level 1 performance requirement against edge blades as described in NIJ Standard-0115.00 entitled "Stab Resistance of Personal Body Armor" dated Sep. 2000 and at least the Type IIA, and preferably at least the Type II, ballistic performance requirement against projectiles as described in NIJ Standard-0101.04 entitled "Ballistic Resistance of Personal Body Armor" dated Sep. 2000. The article of the present invention more preferably additionally meets at least the Level 1 performance requirement against spike as described in NIJ Standard-0115.00 entitled "Stab Resistance of Personal Body Armor" dated Sep. 2000.

The term "article" is used herein to mean the first and second composite structures 10,20 described herein, and products made from such structures 10,20. Such products can include other layers or materials, such as water proofing materials, anti-trauma materials, and carriers or covers to keep layers together. Such products include body armor or other fixed or mobile armor such as panels, blankets or curtains. Such products can be protective apparel such as vests, jackets, gloves, sleeves, shoes and other work wear and sportswear. Such products can also be used for packaging.

The term "projectile" is used herein to mean a bullet or other object or fragment thereof, such as, fired from a gun.

Yarn and Fibers

Each of the fabrics are made of yarns which are made of fibers. For purposes herein, the term "fiber" is defined as a relatively flexible, macroscopically homogeneous body having a high ratio of length to width across its cross-sectional area perpendicular to its length. The fiber cross section can be any shape, but is typically round. Herein, the term "filament" is used interchangeably with the term "fiber".

The fibers in the first plurality of layers 12 can be any length. Such fibers can be cut into staple fibers. The fibers in the second, third and fourth plurality of layers 14,18,22 are "continuous" fibers extending the length of the yarn across the warp or fill directions of the fabric.

The yarns of the first, second and third plurality of layers 12,14,18 have a linear density of about 100 dtex to about 3300 dtex, and preferably about 200 dtex to about 1100 dtex. The yarns of the fourth plurality of layers 22 have a linear density of about 100 dtex to about 1700 dtex, and preferably about 200 dtex to about 660 dtex.

The fibers of the first, second and third plurality of layers 12,14,18 have a linear density of about 0.5 dtex to about 4 dtex, and preferably about 0.7 dtex to about 2.0 dtex. The fibers of the fourth plurality of layers 22 have a linear density of about 0.5 dtex to about 2.5 dtex, and preferably about 0.7 dtex to about 2.0 dtex. The fibers of the layers 12,14,18,22 have a tenacity of at least 10 grams per dtex, and preferably of at least 15 grams per dtex to 55 grams per dtex. The fibers of the first, second, third and fourth plurality of layers 12,14,18,22 exhibit elongation to break of at least 1.5%, and preferably about 2.0% to about 10%. The fibers of the layers 12,14,18,22 exhibit a modulus of elasticity of at least 200 grams per dtex, and preferably about 270 grams per dtex to about 3,000 grams per dtex.

The fibers can be present in uncoated, or coated, or otherwise pretreated (for example, pre-stretched or heat-treated) form in the composite structure 10,20. In case polyaramid fiber is used, it is generally not necessary to coat or otherwise pre-treat the fiber other than arranging it in the appropriate woven or non-woven layer. However, in the case of the fibers in the second plurality of layers 14, a coating might be applied to the fibers in order to increase bonding of the fibers to the corresponding polymeric matrix.

Fiber Polymer

The fibers of the first, second, third and fourth plurality of layers are made of polyamide fibers, polyolefin fibers, polybenzoxazole fibers, polybenzothiazole fibers, poly{2,6-diimidazo[4,5-b4',5'-e] pyridinylene-1,4(2,5-dihydroxy) phenylene} (PIPD) fiber, or mixtures thereof. Preferably, the fibers are made of polyamide.

When the polymer is polyamide, aramid is preferred. By "aramid" is meant a polyamide wherein at least 85% of the amide (—CO—NH—) linkages are attached directly to two aromatic rings. Suitable aramid fibers are described in Man-Made Fibers—Science and Technology, Volume 2, Section titled Fiber-Forming Aromatic Polyamides, page 297, W. Black et al., Interscience Publishers, 1968. Aramid fibers are, also, disclosed in U.S. Pat. Nos. 4,172,938; 3,869,429; 3,819,587; 3,673,143; 3,354,127; and 3,094,511.

Additives can be used with the aramid and it has been found that up to as much as 10 percent, by weight, of other polymeric material can be blended with the aramid or that copolymers can be used having as much as 10 percent of other diamine substituted for the diamine of the aramid or as much as 10 percent of other diacid chloride substituted for the diacid chloride or the aramid.

The preferred aramid is a para-aramid and poly(p-phenylene terephthalamide)(PPD-T) is the preferred para-aramid. By PPD-T is meant the homopolymer resulting from mole-for-mole polymerization of p-phenylene diamine and terephthaloyl chloride and, also, copolymers resulting from incorporation of small amounts of other diamines with the p-phenylene diamine and of small amounts of other diacid chlorides with the terephthaloyl chloride. As a general rule, other diamines and other diacid chlorides can be used in amounts up to as much as about 10 mole percent of the p-phenylene diamine or the terephthaloyl chloride, or perhaps slightly higher, provided only that the other diamines and diacid chlorides have no reactive groups which interfere with the polymerization reaction. PPD-T, also, means copolymers resulting from incorporation of other aromatic diamines and other aromatic diacid chlorides such as, for example, 2,6-naphthaloyl chloride or chloro- or dichlorot-erephthaloyl chloride or 3,4'-diaminodiphenylether.

When the polymer is polyolefin, polyethylene or polypropylene are preferred. By polyethylene is meant a predominantly linear polyethylene material of preferably more than one million molecular weight that may contain minor amounts of chain branching or comonomers not exceeding 5 modifying units per 100 main chain carbon atoms, and that may also contain admixed therewith not more than about 50 weight percent of one or more polymeric additives such as alkene-1-polymers, in particular low density polyethylene, propylene, and the like, or low molecular weight additives such as anti-oxidants, lubricants, ultra-violet screening agents, colorants and the like which are commonly incorporated. Such is commonly known as extended chain polyethylene (ECPE). Similarly, polypropylene is a predominantly linear polypropylene material of preferably more than one million molecular weight. High molecular weight linear polyolefin fibers are commercially available. Preparation of polyolefin fibers is discussed in U.S. Pat. No. 4,457,985.

Polybenzoxazole (PBO) and polybenzothiazole (PBZ) are suitable, such as described in WO 93/20400. Polybenzoxazole and polybenzothiazole are preferably made up of repetitive units of the following structures:

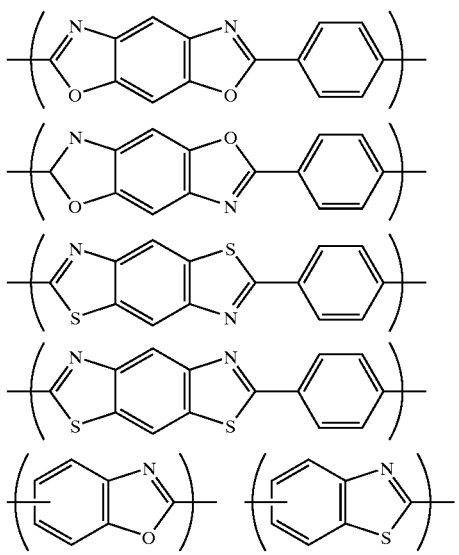

While the aromatic groups shown joined to the nitrogen atoms may be heterocyclic, they are preferably carbocyclic; and while they may be fused or unfused polycyclic systems, they are preferably single six-membered rings. While the group shown in the main chain of the bis-azoles is the preferred para-phenylene group, that group may be replaced by any divalent organic group which doesn't interfere with preparation of the polymer, or no group at all. For example, that group may be aliphatic up to twelve carbon atoms, tolylene, biphenylene, bis-phenylene ether, and the like.

The polybenzoxazole and polybenzothiazole used to make fibers of this invention should have at least 25 and preferably at least 100 repetitive units. Preparation of the polymers and spinning of those polymers is disclosed in the aforementioned International Publication WO 93/20400.

Fabric

Preferably, the fabric of at least one layer of the first and second plurality of layers 12,14 is woven. Most preferably, all the fabric of the first and second plurality of layers 12,14 is woven. However, such fabric can be a woven, knitted, or non-woven structure. The fabric of the third and fourth plurality of layers 18,22 are woven. The fabric of the fourth plurality of layers 22 is tightly woven. By non-woven is meant a network of fibers, including unidirectional (if contained within a matrix resin), felt, and the like. By woven is meant any fabric weave, such as, plain weave, crowfoot weave, basket weave, satin weave, twill weave, and the like. Plain weave is the most common.

Figure 3:
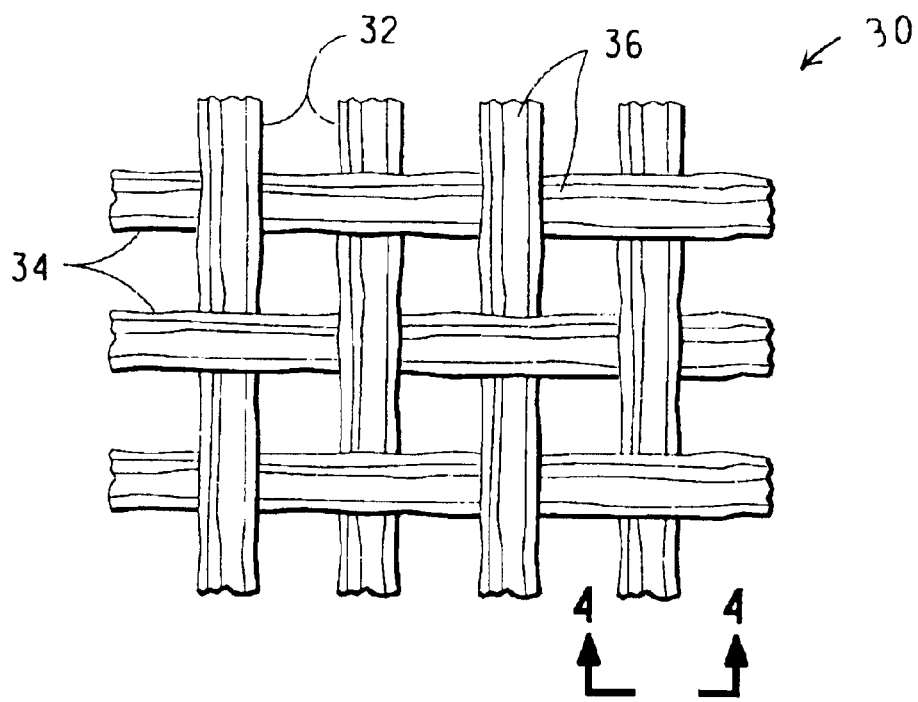
FIG. 3 is a schematic illustration of a plain weave woven fabric.
Figure 4:
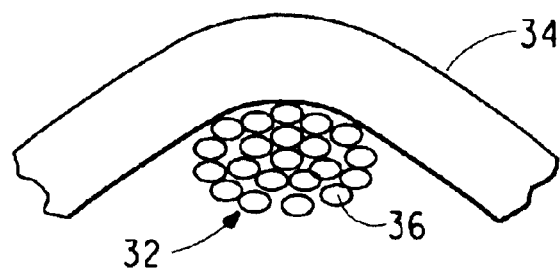
FIG. 4 is a view of an edge of a portion of the woven fabric depicted in FIG. 3 along line 4—4 in the direction of the arrows.
Figure 5:
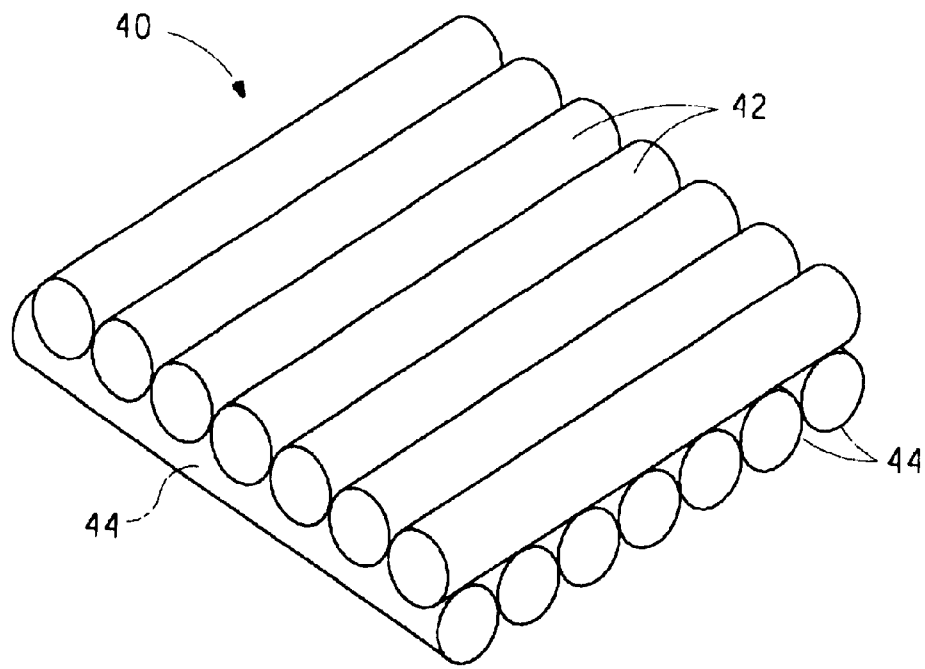
FIG. 5 is a schematic illustration of a non-woven fabric.

FIGS. 3 and 4 schematically illustrate the fabric 30 in layers 12,14,18 and 22 when such fabric is woven in a plain weave. FIGS. 3 and 4 show yarns 32 in the warp direction and yarns 34 in the fill direction. Also illustrated are the fibers 36 making up the yarns 32,34. FIG. 5 schematically illustrates one embodiment of the fabric 40 in layers 12,14 when such fabric is non-woven. The non-woven fabric 40 comprises a first set of yarns 42 and a second set of yarns 44. The first set of yarns 42 are arranged generally in a plane parallel to one another. The second set of yarns 44 are arranged generally in a plane parallel to one another. The second set of yarns 44 are laid adjacent and orthogonal to the first set of yarns 42. However, the second set of yarns 44 can be placed at any angle with respect to the first set.

When woven, the tightness of the fabric of the first and second plurality of layers 12,14, and the tightness of the woven fabric of the plurality of third layers 18, is not particularly important, except it shouldn't be too tight to avoid damage of yarn fibers resulting from the rigors of weavings and it shouldn't be so loose that it becomes too difficult to handle. The fabric of the fourth plurality of layers 22 is "tightly woven" which means that it has a tightness factor of at least 0.75 and preferably about 0.90 to about 1.50. It is most preferred that the tightly woven fabric layers have a relationship between the yarn linear density (dtex) and the fabric tightness factor as follows:

$$Y > X 6.25 \text{ times } 10^{-4} + 0.69 \qquad (1)$$

wherein, Y=fabric tightness factor and X=yarn linear density, as disclosed in the aforementioned U.S. Pat. No. 5,578,358.

"Fabric tightness factor" and "Cover factor" are names given to the density of the weave of a fabric. Cover factor is a calculated value relating to the geometry of the weave and indicating the percentage of the gross surface area of a fabric which is covered by yarns of the fabric. Cover factor can be calculated various ways as is well known in the art. For instance, The method used to calculate Cover factor can be as follows (from Weaving: Conversion of Yarns to Fabric, Lord and Mohamed, published by Merrow (1982), pages 141–143):

dw=width of warp yarn in the fabric
df=width of fill yarn in the fabric
Pw=pitch of warp yarns (ends per unit length)
pf=pitch of fill yarns $$\text{Cover Factor in warp direction} = C_w = \frac{d_w}{p_w} \qquad (2)$$

$$\text{Cover Factor in fill direction} = C_f = \frac{d_f}{p_f} \qquad (3)$$

$$\text{Fabric Cover Factor} = C_{fab} = \frac{\text{total area obscured}}{\text{area enclosed}} \qquad (4)$$

$$C_{fab} = \frac{(p_w - d_w)d_f + d_w p_f}{p_w p_f} \qquad (5)$$
$$= (C_f + C_w - C_f C_w)$$

Depending on the kind of weave of a fabric, the maximum cover factor may be quite low even though the yarns of the fabric are situated close together. For that reason, a more useful indicator of weave tightness is called the "fabric tightness factor". The fabric tightness factor is a measure of the tightness of a fabric weave compared with the maximum weave tightness as a function of the cover factor.

$$\text{Fabric tightness factor} = \frac{\text{actual cover factor}}{\text{maximum cover factor}} \qquad (6)$$

For example, the maximum cover factor which is possible for a plain weave fabric is 0.75; and a plain weave fabric with an actual cover factor of 0.68 will, therefore, have a fabric tightness factor of 0.91. The preferred weave for practice of this invention is plain weave.

Layers

Each layer adds to the thickness and weight of the composite structure, thereby reducing its flexibility, wearability and comfort. Therefore, the numbers of layers in each section has been selected such that the total composite structure is designed and used to protect against each threat rather than a separate section of the structure being designed and used to protect against a separate threat.

In this regard, the first plurality of layers 12 comprises about 2 layers to about 10 layers, and preferably about 4 layers to about 8 layers. The second plurality of layers 14 comprises about 5 layers to about 30 layers, and preferably about 8 layers to about 25 layers. The third plurality of layers 18 comprises about 10 layers to about 40 layers, and preferably about 15 layers to about 30 layers. The fourth plurality of layers 22 comprises about 2 layers to about 20 layers and preferably about 5 layers to about 15 layers.

Each layer of fabric in the second plurality of layers 14 is substantially surrounded and substantially impregnated with the corresponding polymeric matrix comprising a thermoset or thermoplastic resin, or mixtures thereof. A wide variety of suitable thermoset and thermoplastic resins and mixtures thereof are well known in the prior art and can be used as the matrix material. For example, thermoplastic resins can comprise one or more polyurethane, polyimide, polyethylene, polyester, polyether etherketone, polyamide, polycarbonate, and the like. Thermoset resins can be one or more epoxy-based resin, polyester-based resin, phenolic-based resin, and the like, preferably a polyvinlybutyral phenolic resin. Mixtures can be any combination of the thermoplastic resins and the thermoset resins. The proportion of the matrix material in each layer of fabric in the second plurality layers 14 is from about 10% to about 80% by weight of fabric, preferably 20% to 60% by weight of fabric. For enhanced penetration resistance, the polymeric matrices should have a tensile strength of at least 10 MPa, and preferably at least 20 MPa, according to ASTM D-638. The flexural modulus of the polymeric matrices, according to ASTM D-790, is preferably at least 50 MPa. While the upper limit for the flexural modulus is not critical, it is preferred that the polymeric matrices have a flexural modulus of no more than 20,000 MPa so that the layers of fabric in the second plurality layers 14 are not too rigid.

Figure 6:
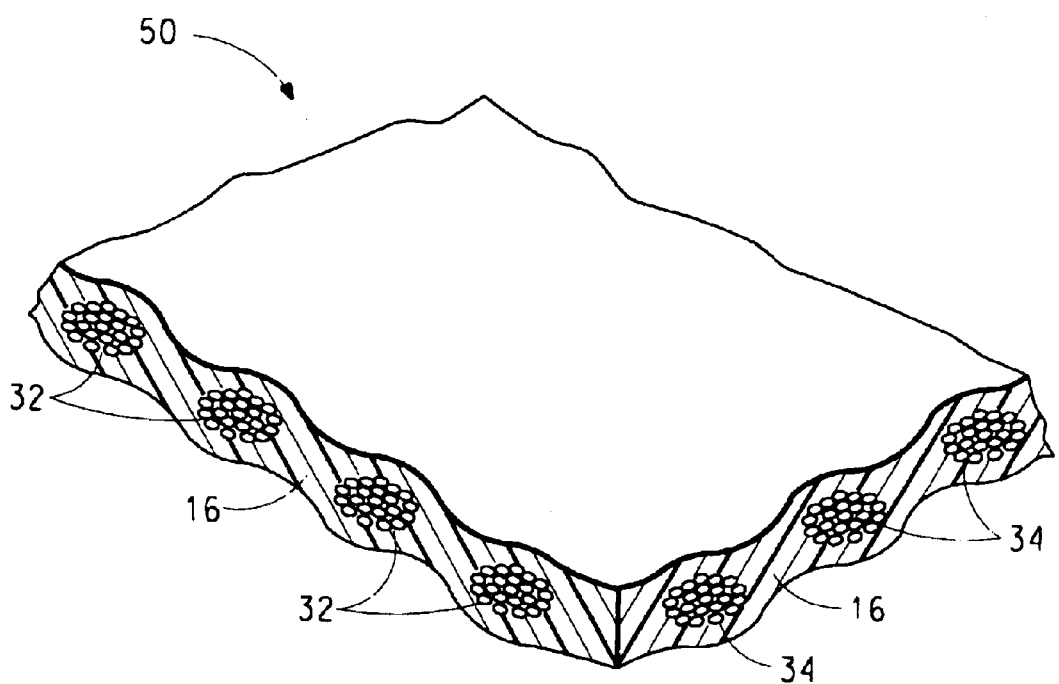
FIG. 6 is a schematic illustration of a woven fabric surrounded and impregnated with a matrix resin as used in the composite structures of the present invention.

FIG. 6 schematically illustrates one of the layers 14 when the resin impregnated fabric is woven. The layer is designed by the number 50 and comprises the woven fabric 30 illustrated in FIGS. 3 and 4 substantially surrounded and substantially impregnated by a corresponding polymeric matrix 16. The matrix 16 in each layer 14 is a single unit or network of resin separate from the matrices 16 in the other layers 14. This provides desired flexibility and comfort in apparel end uses. The resin fills or substantially fills spaces between the yarns and fibers connecting the resin coating the generally planar sides of the fabric 30. Cutting of the layer exposes the yarns 32 and/or 34 along the edges of the fabric 30.

The layers can be held together or joined in any manner, such as, by being sewn together or they can be stacked together and held, for example, in a fabric envelope or carrier. Each of the first, second, third and fourth plurality of layers 12,14,18,22 can be considered to comprise a separate section. The layers which form the sections can be separately stacked and joined, or all of the plurality of layers can be stacked and joined as a single unit.

A combination of the sections of this invention is made by placing the them together, in face to face relation, with or without other layer materials there between, as desired. Other layer materials which may be placed among the sections include, for example, water proofing materials, anti-trauma materials, and the like.

Areal Density

In the first composite structure 10, the first, second and third plurality of layers 12,14,18 combined have an areal density of no more than 6.9 kilograms per square meter (i.e., 1.4 pounds per square foot), and preferably, about 2.9 kilograms per square meter (i.e., 0.6 pounds per square foot) to about 5.9 kilograms per square meter (i.e., 1.2 pounds per square foot). In the second composite structure 20, the first, second, third, and fourth plurality of layers 12,14,18,22 combined have an areal density of no more than 7.8 kilograms per square meter (i.e., 1.6 pounds per square foot), and preferably, about 2.9 kilograms per square meter (i.e., 0.6 pounds per square foot) to about 6.9 kilograms per square meter(i.e., 1.4 pounds per square foot).

When the areal density of the combined plurality of layers exceeds 7.8 kilograms per square meter, the composite structure normally becomes bulky, heavy and rigid. Disadvantageously, the bulkiness, heaviness and rigidity of the composite structures render it uncomfortable to wear. It hinders the wearer to move and maneuver quickly, and causes significant fatigue to the wearer over an extended period of wear.

TEST METHODS

The following test methods were used in the following Examples.

Linear Density

The linear density of a yarn or fiber is determined by weighing a known length of the yarn or fiber based on the procedures described in ASTM D1907-97 and D885-98. Decitex or "dtex" is defined as the weight, in grams, of 10,000 meters of the yarn or fiber.

Tensile Properties

The fibers to be tested are conditioned and then tensile tested based on the procedures described in ASTM D885-98. Tenacity (breaking tenacity), elongation to break, and modulus of elasticity are determined by breaking test fibers on an Instron tester.

Areal Density

The areal density of the fabric layer is determined by measuring the weight of each single layer of selected size, e.g., 10 cm×10 cm. The areal density of the composite structure is determined by the sum of the areal densities of the individual layers.

Knife Stab Resistance

Knife stab resistance tests of the multi-layer panels are conducted in accordance with NIJ Standard-0115.00 "Stab Resistance of Personal Body Armor" for protection class of edge blade, issued in Sep. 2000.

Spike Stab Resistance

Spike resistance tests of the multi-layer panels are conducted in accordance with NIJ Standard-0115.00 "Stab Resistance of Personal Body Armor" for protection class of spike, issued in Sep. 2000.

Ballistic Performance

Ballistic tests of the multi-layer panels are conducted in accordance with NIJ Standard-0101.04 "Ballistic Resistance of Personal Body Armor", issued in Sep. 2000.

EXAMPLES

This invention will now be illustrated by the following specific examples. All parts and percentages are by weight unless otherwise indicated.

Preparation of Layers

Several different yarns of aramid, polyolefin and poly (p-phenylene-2,6-benzobisoxazole) materials were made into layers of the following fabrics or resin impregnated fabrics.

1. Plain weave fabric of 400 denier (i.e., 440 dtex) poly(p-pheynlene terephthalamide) yarn commercially available from E. I. du Pont de Nemours and Company ("DuPont") under the trademark Kevlar®, with a tenacity of 24.5 grams per dtex, a modulus of 670 grams per dtex, and elongation of 3.4%, was made at 31×31 ends per inch (i.e., 12.2×12.2 ends per centimeter). The fabric was then impregnated with about 50 wt % of the total layer weight of polyvinyl butyral/phenolic thermoset resin. The resin has a tensile strength of greater than 15 MPa according to ASTM D-638 and has a flexural modulus of greater than 500 MPa according to ASTM D-790. (These resin properties are based on general knowledge in the art and were not measured during this experiment.) This layer is identified as layer "A" below. This fabric layer is commercially available from DuPont under product number AS299 and is made in accordance with the manufacturing process described in U.K. patent application GB 2304350A.

2. Unidirectional extended chain polyethylene fiber (UDECPE) crossplied in 0/90 degree orientation (such as illustrated in FIG. 5), sandwiched with polyethylene film manufactured from Honeywell, Inc., under the trademark Spectrashield Plus®. This layer is identified as layer "B" below.

3. Plain weave fabric of 400 denier (i.e., 440 dtex) poly(p-pheynlene terephthalamide) yarn available from E. I. du Pont de Nemours and Company under the trademark Kevlar®, with a tenacity of 24.5 grams per dtex, a modulus of 670 grams per dtex, and elongation of 3.4%, was made at 28×28 ends per inch (11×11 ends per centimeter). This layer is identified as layer "C" below.

4. Plain weave of hybrid weave fabric of 50 wt % of the total layer weight of 400 denier (440 dtex) poly(p-phenylene terephthalamide), available from E. I. du Pont de Nemours and Company under the trademark Kevlar®, with a tenacity of 24.5 grams per dtex, a modulus of 670 grams per dtex, and elongation of 3.4%, and 50% wt % of the total layer weight of 500 denier (550 dtex) poly(p-phenylene-2,6-benzobisoxazole) (PBO), available from Toyobo Co., Ltd, under the trademark Zylon®, with a tenacity of 38 grams per dtex, a modulus of 1260 grams per dtex, and elongation of 3.5%, was made into 26×26 ends per inch (10.2×10.2 ends per centimeter). This layer is identified as layer "D" below.

5. Plain weave of fabric of 500 denier (550 dtex) poly(p-phenylene-2,6-benzobisoxazole), available from Toyobo Co., Ltd., under the trademark Zylon®, with a tenacity of 38 grams per dtex, a modulus of 1260 grams per dtex, and elongation of 3.5%, was made into 30×30 ends per inch (11.8×11.8 ends per centimeter). This layer is identified as layer "E" below.

6. Plain weave of fabric of 200 denier (220 dtex) yarn available from E. I. du Pont de Nemours and Company under the trademark Kevlar®, with a tenacity of 24.5 grams per dtex, a modulus of 630 grams per dtex, and elongation of 3.4%, was made at 70×70 ends per inch (27.6×27.6 ends per centimeter), a tightly woven fabric with a fabric tightness factor of 0.996. This layer is identified as layer "F" below.

COMPARATIVE EXAMPLE

The above fabric layers of "A", "B", and "C" were made into various composite structures on which to conduct ballistic and knife stab tests. In order to compare the sample results, the samples were designed and assembled to have similar areal densities. Stab tests against a P1 edge blade were conducted based on the test protocol for Level 1 as described in NIJ Standard-0115.00 entitled "Stab Resistance of Personal Body Armor" dated Sep. 2000. The test protocol specifies a maximum allowable penetration of no more than 7 mm when tested at 24 joules, and no more than 20 mm when tested at 36 joules, in order to meet the Level 1 performance requirement. Results of the stab tests are shown in Table 1 below.

TABLE 1

| Comparative Sample | Construction | Areal density (kg/sqm) | Penetration Depth, mm @ 24 J | @ 36 J |
|---|---|---|---|---|
| a | 30 layers "A" | 5.0 | 0 (<7 mm) | 12 (<20 mm) |
| b | 50 layers "B" | 5.6 | 27 (failed) | 43 (failed) |
| c | 58 layers "C" | 5.9 | 11 (failed) | 27 (failed) |
| d | 15 layers "A" (striking face) stacked on 34 layers "C" (inner face) | 5.9 | 9 (failed) | 25 (failed) |
| e | 34 layers "C" (striking face) stacked on 15 layers "A" (inner face) | 5.9 | 2 (<7 mm) | 12 (<20 mm) |

It is noted that, with an areal density of 5.0 kg per square meter, sample "a" with resin coated Kevlar® fabric layers exhibited excellent resistance against the P1 edge blade. It is also noted that both Spectrashield Plus® and uncoated aramid, within an areal density of 5.6–5.9 kg per square meter, as shown in samples "b" and "c", showed poorer resistance against the P1 edge blade.

While sample "d" failed the test against the P1 edge blade, results of sample "e" showed a remarkably higher resistance against the P1 edge blade when the uncoated poly(p-phenylene terephthalamide) fabric section was located on the top of resin impregnated fabric as the striking face against the knife stab.

The above fabric layers were also assembled and tested against 9 mm and 0.357 magnum bullets per test protocol for Type II as described in NIJ Standard -0101.04 entitled "Ballistic Resistance of Personal Body Armor" dated Sep. 2000. The backface deformation of no more than 44 mm is required to meet the performance requirement. Further, to meet the performance requirement, the projectile can not completely penetrate the sample. Results of the ballistic tests are shown in Table 2 below.

TABLE 2

| Comparative Sample | Construction | Areal density (kg/sqm) | Backface Deformation, mm against 9 mm at 1205 ft/sec | against .357 mag. at 1430 ft/sec |
|---|---|---|---|---|
| f | 30 layers "A" | 5.0 | completely penetrated (failed) | completely penetrated (failed) |
| g | 50 layers "B" | 5.6 | — | — |
| h | 58 layers "C" | 5.9 | — | — |
| i | 15 layers "A" (striking face) stacked on 34 layers "C" (inner face) | 5.9 | 35 | 48 (failed) >44 mm |
| j | 34 layers "C" (striking face) | 5.9 | 22 | 50 (failed) >44 mm |

TABLE 2-continued

| Comparative Sample | Construction | Areal density (kg/sqm) | Backface Deformation, mm | |
|---|---|---|---|---|
| | | | against 9 mm at 1205 ft/sec | against .357 mag. at 1430 ft/sec |
| | stacked on 15 layers "A" (inner face) | | | |

It is noted that sample "f" showed poor ballistic resistance, in spite of the composite structure, as shown in sample "a" having excellent resistance against the P1 edge blade. It is also noted that both samples "i" and "j" failed to meet the backface deformation requirement of <44 mm against 0.357 magnum bullet for NIJ ballistic Type II. Samples in "g" and "h" were not tested.

The above stab and ballistic test results revealed a high degree of difficulty to provide multi-threat protections, such as against both knife stab and ballistics, via a lighter weight protective body armor, e.g., having an areal density less than 1.4 pounds per square foot. It is noted that each one of five composite structures tested in these comparative samples failed to meet both the performance requirement for NIJ ballistic Type II and NIJ—Edge Blade Level 1 for protection against multiple threats.

INVENTION EXAMPLE 1

Fabric layers of "A", "C", "D", and "E" were made into samples of various composite structures of this invention on which to conduct ballistic and knife stab tests. Stab tests against the P1 edge blade were conducted based on the test protocol for Level 1 as described in the NIJ Standard-0115.00 entitled "Stab Resistance of Personal Body Armor" dated Sep. 2000. The standard allows a maximum allowable penetration of no more than 7 mm when tested at 24 joules, and no more than 20 mm when tested at 36 joules, in order to meet the Level 1 performance requirement against the P1 edge blade. Results of the stab tests are shown in Table 3 below.

TABLE 3

| Invention Sample | Construction | Areal density (kg/sqm) | Penetration Depth, mm | |
|---|---|---|---|---|
| | | | @ 24 J | @ 36 J |
| 1 | 28 layers "C" (striking face) 15 layers "A" (middle) 6 layers "C" (inner face) all stacked in order | 5.9 | 2 (<7 mm) | 7 (<20 mm) |
| 2 | 24 layers "D" (striking face) 15 layers "A" (middle) 6 layers "D" (inner face) all stacked in order | 5.4 | 3 (<7 mm) | 10 (<20 mm) |
| 3 | 18 layers "E" (striking face) 14 layers "A" (middle) 6 layers "E" (inner face) all stacked in order | 5.4 | 2 (<7 mm) | 8 (<20 mm) |

It is noted that the composite structures of this invention with the resin impregnated fabric layers sandwiched between uncoated woven fabric layers provided remarkably higher resistance against the knife stab, than Comparative Samples "b", "c" and "d".

The above composite structures were also assembled and tested against 9 mm and 0.357 magnum bullets per test protocol for Type II as described in NIJ Standard-0101.04 entitled "Ballistic Resistance of Personal Body Armor" dated Sep. 2000. The backface deformation of no more than 44 mm is required to meet the performance requirement. Further, to meet the performance requirement, the projectile can not completely penetrate the sample. Results of the ballistic tests are shown in Table 4 below

TABLE 4

| Invention Sample | Construction | Areal density (kg/sqm) | Backface Deformation, mm | |
|---|---|---|---|---|
| | | | against 9 mm at 1205 ft/sec | against .357 mag. at 1430 ft/sec |
| 6 | 28 layers "C" (striking face) 15 layers "A" (middle) 6 layers "C" (inner face) all stacked in order | 5.9 | 18 < 44 mm | 37 < 44 mm |
| 7 | 24 layers "D" (striking face) 15 layers "A" (middle) 6 layers "D" (inner face) all stacked in order | 5.4 | 25 < 44 mm | 38 < 44 mm |
| 8 | 18 layers "E" (striking face) 14 layers "A" (middle) 6 layers "E" (inner face) all stacked in order | 5.4 | 20 < 44 mm | 34 < 44 mm |

It is noted that the composite structures of this invention with resin impregnated fabric layers sandwiched between uncoated woven fabrics layers also showed surprising lower backface deformation against the bullets, in addition to the remarkably higher resistance against the knife stab.

From these test results, it is seen that composite structures of this invention exhibited good protection against both ballistic and knife stab threats at a relatively low areal density.

INVENTION EXAMPLE 2

Fabric layers "F" were added to Sample 6 as a composite structure on which to conducted additional test against spike stab based on the test protocol for Level 1 as described in NIJ Standard-0115.00 entitled "Stab Resistance of Personal Body Armor" for protection class of spike dated Sep. 2000. The Standard allows a maximum allowable penetration of no more than 7 mm when tested at 24 joules, and no more than 20 mm when tested at 36 joules, in order to meet the Level 1 performance requirement against spike. Results of the stab test against the spike are shown in Table 5 below.

TABLE 5

| Invention Example | Construction | Areal density (kg/sqm) | Penetration Depth, mm @ 24 J | Penetration Depth, mm @ 36 J |
|---|---|---|---|---|
| 9 | 5 layers "F" (striking face) 28 layers "C" 15 layers "A" 6 layers "C" (inner face) all stacked in order | 6.6 | 0 (<7 mm) | 4 (<20 mm) |

The fabric tightness factor for the tightly woven fabric layer "F" was determined as follows.

First, the diameter or width of the warp and fill yarns, dw and df, in the fabric was calculated. The diameter or width of the warp and fill yarns, dw and df, can be calculated various ways as is well known in the art. In this Example, the equation used is disclosed in "Practical Loom Experience on Weavability Limits", by J. B. Dickson, pages 1083–1093 of Textile Research Journal (1954) as shown immediately below:

$$dw=df=0.438/\sqrt{1.44*26.5}=0.0071"  \quad (7)$$

where 1.44 denotes the density of the 220 dtex Kevlar® yarn and 26.5 denotes the amount of 220 dtex Kevlar® yarn required to weigh 453.6 grams with 840 yards (i.e., 769 meter) skeins.

Then pw, pf, Cw, Cf, $C_{fab}$, and finally the Fabric tightness factor of fabric layer "F" were calculated as follows.

$$pw=pf=\text{pitch of yarns}=1/70=0.0143"$$

$$C_w=dw/pw=C_f=df/pf=0.007"/0.0143"=0.497$$

$$\text{Fabric cover factor}=C_{fab}=(C_f+C_w-C_fC_w)=0.747$$

$$\text{Fabric tightness factor of fabric layer "F"}=0.747/0.75=0.996$$

It is noted that the above composite structure of this invention exhibited good protection against the spike threat. The results indicate that the composite structures of this invention also exhibited good protection against various multithreats, including bullet, knife and spike, and is relatively flexible and light weight.

What is claimed is:

1. A knife and ballistic projectile penetration resistant article, comprising, in order:
    a first plurality of layers of fabric made of fibers;
    a second plurality of layers of fabric made of fibers, each of the layers being substantially surrounded and impregnated by a corresponding polymeric matrix comprising a thermoset resin, a thermoplastic resin, or mixtures thereof; and
    a third plurality of layers of woven fabric made of fibers,
    wherein the fibers of the first, second and third plurality of layers have a tenacity of at least 10 grams per dtex and wherein the first, second and third plurality of layers combined have an areal density of no more than 6.9 kilograms per square meter.

2. The article of claim 1, wherein the first plurality of layers comprises about 2 to about 10; the second plurality of layers comprises about 5 to about 30 layers; and the third plurality of layers comprises about 10 to about 40 layers.

3. The article of claim 1, wherein yarn of the first, second and third plurality of layers has a linear density of about 100 dtex to about 3300 dtex, and the fibers of the first, second and third plurality of layers have a linear density of about 0.5 dtex to about 4 dtex.

4. A spike, knife and ballistic projectile penetration resistant article, comprising, in order:
    a first plurality of layers of fabric made of fibers;
    a second plurality of layers of fabric made of fibers, —each of the fabric layers being substantially surrounded and impregnated with a corresponding polymeric matrix comprising a thermoset resin, a thermoplastic resin, or mixtures thereof;
    a third plurality of layers of woven fabric made of fibers; and
    a fourth plurality of layers of tightly woven penetration resistant fabric made of fibers, the tightly woven fabric having a fabric tightness factor of at least 0.75,
    wherein the fibers of the first, second, third and fourth plurality of layers have a tenacity of at least 10 grams per dtex and wherein the first, second, third, and fourth plurality of layers combined have an areal density of no more than 7.8 kilograms per square meter.

5. The article of claim 4, wherein the first plurality of layers comprises about 2 layers to about 10 layers; the second plurality of layers comprises about 8 layers to about 25 layers; the third plurality of layers comprises about 10 layers to about 40 layers; and the fourth plurality of layers comprises about 2 layers to about 20 layers.

6. The article of claim 4, wherein
    yarn of the first, second, and third plurality of layers has a linear density of 100 to 3300 dtex, and the fibers of the first, second, and third plurality of layers have a linear density of 0.5 to 4 dtex; and
    yarn of the fourth plurality of layers has a linear density of 100 to 1700 dtex, and the fibers of the fourth plurality of layers have a linear density of 0.5 to 2.5 dtex.

7. The article of claim 4, wherein an outer face of the fourth plurality of the layers is the strike face for penetration threats.

8. The article of claim 1 or 4, wherein the fibers of each of the plurality of layers are selected from the group consisting of polyamide fibers, polyolefin fibers, polybenzoxazole fibers, polybenzothiazole fibers, poly{2,6-diimidazo[4,5-b4',5'-e]pyridinylene-1,4(2,5-dihydroxy)phenylene}, and mixtures thereof.

9. The article of claim 1 or 4, wherein the fibers in each of the plurality of layers are para-aramid.

10. The article of claim 1 or 4, wherein the fibers in each of the plurality of layers exhibit elongation to break of at least 1.5% and a modulus of elasticity of at least 200 grams per dtex.

11. The article of claim 1 or 4, wherein yarns of at least one layer of the first or second layers are woven.

12. The article of claim 1 or 4, wherein yarns of at least one layer of the first or second layers are non-woven.

13. The article of claim 1 or 4, wherein the article meets at least the Level 1 performance requirement against edge blades as described in NIJ Standard-0115.00; and the article meets at least the Type IIA ballistic performance requirement as described in NIJ Standard-0101.04.

14. The article of claim 4, wherein the article meets at least the Level 1 performance requirement against spike as described in NIJ Standard-0115.00.

15. The article of claim 1 or 4, wherein the polymeric matrices have a tensile strength of at least 10 MPa, and the polymeric matrices have a flexural modulus of at least 50 MPa.

* * * * *